UNITED STATES PATENT OFFICE.

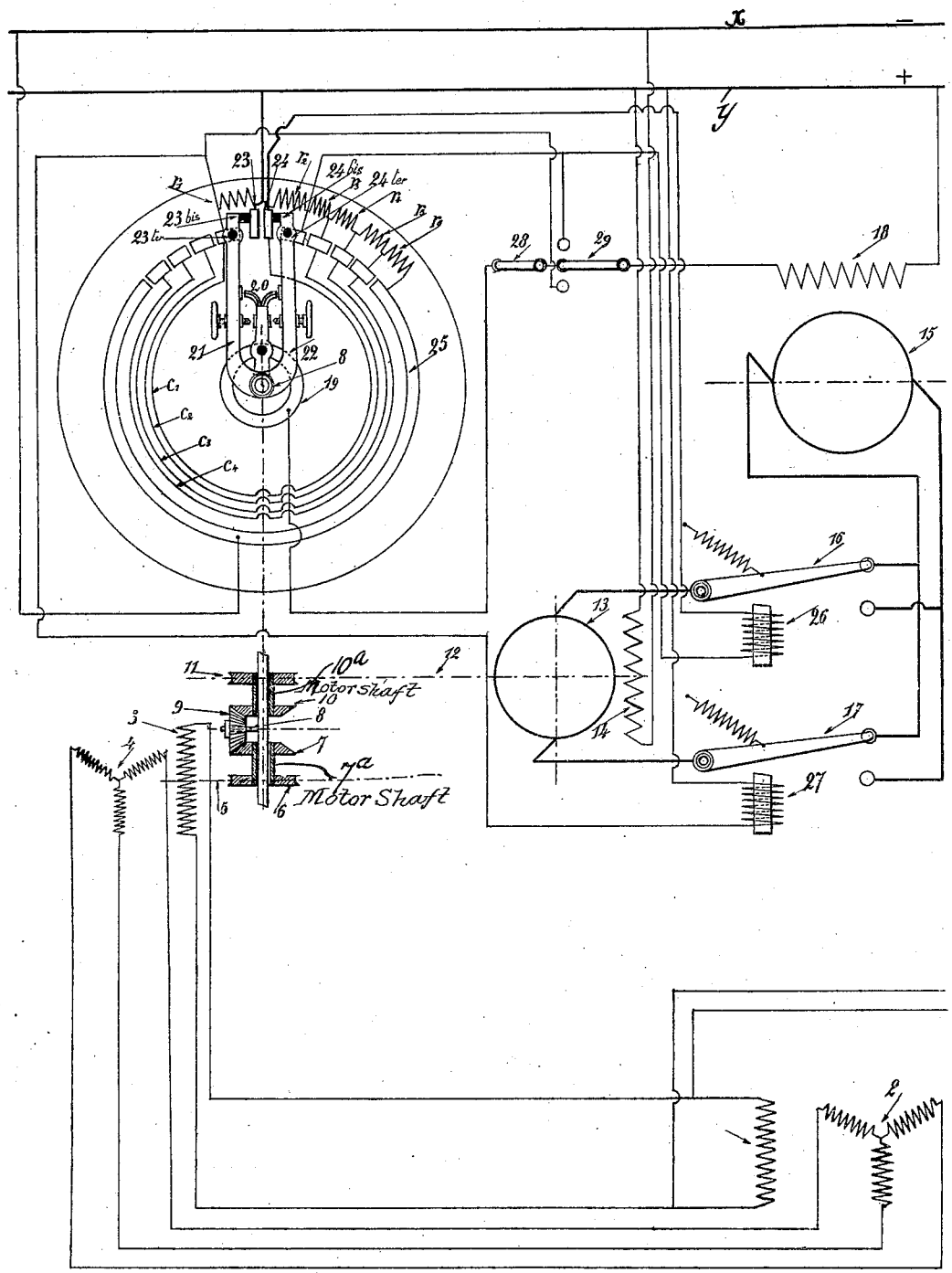

JOSEPH LOUIS ROUTIN, OF LYON, FRANCE.

CONTROLLING ELECTRIC MOTORS.

935,327.

Specification of Letters Patent. Patented Sept. 28, 1909.

Application filed February 10, 1908. Serial No. 415,159.

*To all whom it may concern:*

Be it known that I, JOSEPH LOUIS ROUTIN, residing at Lyon, France, have invented certain new and useful Improvements in Controlling Electric Motors, of which the following is a specification.

The present invention has for its object a device which allows of controlling an electric motor from a distance and of automatically insuring its stoppage when the mechanism at the receiving station is in a certain position; it is particularly applicable to cases in which great precision and high power are both required, for example for controlling the rotors of turbines in hydro-electrical works or for controlling the movements of navigable vessels.

The annexed drawing represents a diagram of the entire arrangement at a controlling station and at a receiving station.

*Controlling station.*—The controlling station comprises an asynchronous motor fed in single phase to the rotor 1 and carrying on the stator 2 a three-phase winding.

*Receiving station.*—The receiving station comprises what I term a three-phase current receiver of orders and a continuous current servo-motor.

The receiver of orders consists of an asynchronous motor the stator 4 of which carries a three-phase winding connected to the stator 2 of the transmitting station and the rotor 3 of which is fed in single phase by the circuit which feeds the rotor 1 of the transmitting station.

The continuous current servo-motor comprises in principle an auxiliary generator the armature 15 of which is in continuous rotation and the field-magnet 18 of which is fed at variable tension by a potentiometer. It is this auxiliary generator which controls the armature 13 of the local motor, the field-magnet 14 of which is constantly excited.

The spindle 5 of the order-receiver acts by means of an endless screw on a worm wheel 6 fixed to a beveled pinion 7; the combined wheels 6 and 7 are loosely mounted on a hollow shaft 7ª concentric with the shaft 8 which controls the rheostat of the auxiliary generator.

The wheel is geared to the planet-pinion 9, and a third beveled pinion 10 fixed to the wheel 11, rigidly mounted on a hollow shaft 10ª concentric with shaft 8, completes the differential equipment which allows of controlling the rheostat either by the order-receiver or by the shaft 12 of the local motor; the movement from 12 to 11 is transmitted by means of worm gear.

To render the figures more clear all this first part of the apparatus has been shown in sectional plan view, whereas that which follows is shown in elevation.

The local motor comprises an armature 13 and field-magnet 14; the latter is constantly excited. At rest, the armature 13 is short-circuited on itself (as shown in the diagram). It can be started in one direction or the other by lowering one of the levers 16 and 17; this displacement effects the connection, in series, of 13 and the armature 15 of the auxiliary generator.

The magnet coil 18 of the auxiliary generator is connected at one of its ends to one of the poles of the continuous current conductor $x$ $y$, and at the other to the small metal circle 19 which is fixed to the potentiometer rheostat. On this circle bears continuously a movable contact fixed to the arm 20, which is fixed to the shaft 8. On the same shaft 8 are loosely mounted two other arms 21 and 22 which are continuously pulled, by antagonistic springs, to turn in opposite directions, and which at rest abut against stops 23 and 24. In addition to having contacts $23^{bis}$ and $24^{bis}$, the arms 21 and 22 are provided with two more contacts $23^{ter}$ and $24^{ter}$ connected respectively to the former, and which rub against fixed contacts arranged in the circle 25. Between these contacts are arranged, as shown in the diagram, resistances $r_1$, $r_2$, $r_3$, $r_4$ etc., and connections $c_1$, $c_2$, $c_3$, $c_4$ etc. All the resistances $r_1$ $r_2$ $r_3$ $r_4$ etc. . . $r_n$ are connected in series, and the whole is mounted as a potentiometer between the two conductors supplying continuous current at 110 volts. At rest, the resistances $r_1$ and $r_2$ are placed in short circuit by the abutment contacts $23^{bis}$ and $24^{bis}$ of the arms 21 and 22.

The displacement of the levers 16 and 17 is effected by the electromagnets 26 and 27 respectively connected to the ends of resistances $r_2$ and $r_1$. When 20 is displaced toward the right it first establishes electric connection between $24^{ter}$ and the fixed circle 19, and then, acting on a regulatable abutment screw, it moves 22 toward the right.

When 20 returns, $24^{bis}$ first abuts against 24, and then the connection between $24^{ter}$ and 19 is broken; if 20 passes the position of rest and continues its movement toward the left it first establishes connection between 23$^{ter}$ and 19, and then 21 is itself moved with 20.

*Action.*—When the rotor 1 is displaced at the controlling station the rotor 3 at the receiving station is immediately displaced the same amount and causes rotation of 5. Supposing that, by reason of this rotation, the shaft 8 is rotated clockwise, when 24$^{bis}$ moves away from 24 the electro 26 attracts 16, and 15 sends a current into 13, which produces rotation of 12 in such direction that by the action of the differential the shaft 8 tends to be moved in anticlockwise direction. When the displacement of 5 has ceased the arm 20 will thus be brought back to the position of rest; 24$^{bis}$, abutting against 24, will place $r_2$ in short circuit, the electromagnet 26 will cease to attract the lever 16; 13 will be placed in short circuit and consequently powerfully braked, since 14 remains excited. If 20 moves to the left from the position of rest, 23$^{ter}$ is placed in connection with 19, and the short-circuit to $r_1$ being broken the electromagnet 27 attracts, and 15 sends into 13 a current tending to turn 12 in such direction that by the action of the differential the shaft 8 tends to be rotated clockwise and to let 20 return toward the right.

Since the resistances $r$, $r_2$, $r_3$, etc. are all connected in series and form a potentiometer, the excitation of 18 and consequently the speed of 13 will become greater as 20 is moved from the position of rest. By the action of the differential the speed of 13 tends always to become proportional to that of 5. Any order comprising a sudden variation, important in the position of the conducting member, will be executed at high speed, whereas the small displacements will be executed slowly.

If it is desired to insure synchronism for control of all the receivers in the service, it is sufficient to arrange matters so that the receiving motor, at the maximum tension which can be supplied thereto, communicates to the movable member of the differential a speed exceeding that which the latter receives from the three-phase order receiver.

When it is desired to vary the execution of the order transmitted it is sufficient to open the interrupter 28; on the other hand, when it is desired to procure the execution of the order registered by the displacement of 20, it is sufficient to close 28.

It may be desirable (for example, in the case of controlling the regulating devices of groups of electro-generators when a new unit is brought into service) to be able to cause at will, at reduced speed, the execution of the registered order; for this it is sufficient to operate the reverser 29 before closing the interrupter 28, which produces instantaneous execution.

It is always desirable to interpose between 12 and the controlled device a non-reversible worm gear transmission.

If there is risk of shocks on stopping, by reason of the speed acquired, one may mount the screw between two series of Belleville disks, so as to enable it to make a certain axial movement.

If there is risk of reversibility of the mechanism, there is placed on the shaft of the motor a brake which is electrically disengaged, either by the main current or by a special control.

In all cases where there is risk at the moment of stoppage, of a powerful electric brake current, it is desirable to momentarily keep the lever 16 or 17 lowered until the current has dropped to a value approximating to that which can be furnished by the hysteresis of the auxiliary generator. For this purpose two electromagnets traversed by the main current are added to the reverser.

*Connections between the controlling station and receiving station.*—The lines of connection for the transmission of order comprise five wires two of which are used for feeding in single-phase the rotors of the receivers, and three for the connections between the stators.

What I claim as my invention and desire to secure by Letters Patent of the United States is:—

1. A servo-motor comprising in combination a polyphase current transmitter; a polyphase current receiver; an auxiliary generator the excitation of which is controlled by the receiver; a motor with constant excitation fed by the auxiliary generator; a differential gear whereby the motor reacts on the excitation of the auxiliary generator and a reverser controlled by relays, adapted to come into action when the auxiliary generator is excited.

2. A servo-motor comprising in combination a polyphase current transmitter; a polyphase current receiver; an auxiliary generator the excitation of which is controlled by the receiver; a motor with constant excitation fed by the auxiliary generator, a differential gear whereby the motor reacts on the excitation of the auxiliary generator and a reverser controlled by relays, adapted to come into action when the auxiliary generator is excited and to automatically establish a short-circuit at the terminals of the armature, when the motor is to be stopped.

In witness whereof I have signed this specification in the presence of two witnesses.

JOSEPH LOUIS ROUTIN.

Witnesses:
 THOS. N. BROWNE,
 MARIN VACHON.